(12) United States Patent
Plowman

(10) Patent No.: US 11,407,363 B2
(45) Date of Patent: Aug. 9, 2022

(54) METHOD FOR CALCULATING A TOW HITCH POSITION

(71) Applicant: CONTINENTAL AUTOMOTIVE GMBH, Hannover (DE)

(72) Inventor: Robin Plowman, Southwick (GB)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/735,219

(22) Filed: Jan. 6, 2020

(65) Prior Publication Data

US 2020/0215992 A1  Jul. 9, 2020

(30) Foreign Application Priority Data

Jan. 7, 2019 (EP) ..................... 19150591

(51) Int. Cl.
*H04N 7/18* (2006.01)
*B60R 11/04* (2006.01)
*G06T 7/73* (2017.01)
*G06T 7/00* (2017.01)

(52) U.S. Cl.
CPC ............... *B60R 11/04* (2013.01); *G06T 7/73* (2017.01); *G06T 7/97* (2017.01); *G06T 2207/30252* (2013.01)

(58) Field of Classification Search
CPC .............. B60R 1/00; B60R 2300/8093; B60R 2300/30; B60R 2300/305; B60R 2300/607; B60R 2300/806; B60R 2300/8066; B60R 2300/808; B60R 2300/8086; B60W 10/20; B60W 2300/14; B60W 2420/42; B60W 30/09; B60W 10/10; B60W 10/18

USPC .......................................................... 348/148
See application file for complete search history.

(56) References Cited

U.S. PATENT DOCUMENTS

| | | | |
|---|---|---|---|
| 2017/0174023 A1* | 6/2017 | Hu ..................... | G06K 9/00791 |
| 2018/0215382 A1* | 8/2018 | Gupta ............. | B60W 30/18036 |
| 2018/0276839 A1* | 9/2018 | Diessner ................... | G06T 7/60 |

FOREIGN PATENT DOCUMENTS

| | | | | |
|---|---|---|---|---|
| DE | 102014223141 A1 * | 5/2016 | ............... | B60D 1/06 |
| DE | 102014223141 A1 | 5/2016 | | |
| DE | 102016117284 A1 | 3/2018 | | |

OTHER PUBLICATIONS

Christian et al (Advanced 3-D trailer pose estimation for Articulated vehicles, Published on Jun. 28-Jul. 1, 2015, IEEE) (Year: 2015).*
European Search Report dated Mar. 26, 2019 for corresponding European Patent Application No. 19150591.6.

* cited by examiner

*Primary Examiner* — Masum Billah

(57) ABSTRACT

A method for calculating a tow hitch position of a trailer is presented. A first and a second image of the trailer is captured and a trailer rotation and translation relative to a known zero pose of the trailer based on the captured first and second images is calculated. The rotation axes of the trailer in the first and second image is calculated based on the calculated trailer rotations and translations. An intersection of the first and second rotation axis is calculated to determine a ray to the tow hitch position. The ray to the tow hitch position and a geometrical condition are used to calculate the tow hitch position.

20 Claims, 2 Drawing Sheets

METHOD FOR CALCULATING A TOW HITCH POSITION

CROSS-REFERENCE TO RELATED APPLICATIONS

This application claims the benefit European Application 19150591.6, filed Jan. 7, 2019, which is hereby incorporated by reference in its entirety.

TECHNICAL FIELD

The disclosure relates to a method for calculating a vector to a tow hitch position on a vehicle, a calculation unit of a vehicle for calculating the vector to the tow hitch position and a vehicle including such a calculation unit, a computer program and a computer readable medium.

BACKGROUND

Trailer Hitch Assist systems are designed to support the driver in coupling a trailer to a vehicle. Trailer Hitch Assist systems need information about the orientation of the trailer and the position of tow hitch mounted on the vehicle. Trailer Reverse Assist systems are designed to support the driver in reversing a vehicle with a trailer attached. Trailer Reverse Assist systems may need information about the position of the tow hitch in relation to the position of the camera, i.e. a vector to the tow hitch from the camera. Such systems may not need to know the distance of the tow hitch along this vector, since these systems only need to calculate the rotation of the trailer, which is invariant to this distance.

The tow hitch position may be measured manually which is inaccurate, costly and time consuming, especially when the tow coupling is not mounted during the manufacturing of the vehicle or in cases where the tow coupling can be moved manually or electronically on the vehicle.

The tow hitch is a point on the vehicle at which the trailer pivots around as it moves. This may be a tow ball, or other means of attachment.

There may be a desire to determine the position of the tow hitch electronically, or to determine a vector to the tow hitch from the camera.

SUMMARY

One aspect of the disclosure provides a method for calculating a vector to the tow hitch position of a vehicle. The method includes capturing a first image of the trailer in a first position and capturing a second image of the trailer in a second position using an image capture device (step S1). The method includes calculating a trailer rotation and a trailer translation between the first pose and the second pose based on the captured first image and the captured second image (step S2). Additionally, the method includes calculating a first rotation axis (Euler axis) of the trailer between the first image and the second image based on the calculated trailer rotation and trailer translation (step S3). The method also includes repeating steps S1 to S3 with a third and a fourth image of the trailer thereby calculating a second rotation axis of the trailer between the third image and the fourth image (steps S1* to S3*). The method includes determining an intersection of the first and second rotation axis to determine a vector to the tow hitch position (step S4). In some examples, the method includes using the vector to the tow hitch position and a geometrical condition to calculate the tow hitch position (step S5).

In some examples, the steps S1 to S3 may be iterated at least once or a plurality of times. This iteration could reuse the first image when comparing with a third image, or a new pair of images could be used, so that the second rotation axis is calculated using a third and fourth image for instance.

In other words, the tow hitch position is calculated essentially by first comparing two images of the trailer which results in a first rotation axis. The first image may be an image of the trailer with known orientation, e.g., an orientation where no rotation or translation is assumed relative to the longitudinal axis of the vehicle. The translation of the trailer occurs because the trailer appears to undergo translation as well as rotation as it rotates around the tow hitch due to the relative location of the image capture device and the tow hitch.

Implementations of the disclosure may include one or more of the following optional features. In some implementations, the image may be captured by a camera mounted on the vehicle, which has the trailer in view. This image is designated as zero pose image in this disclosure. In principle, as rotation and translation are relative, any orientation and translation may be defined as zero pose. In order to calculate a rotation axis, the second image is an image where the trailer shows a rotation relative to the first image. Such an image may, for example, be captured during driving when the trailer is coupled to the vehicle. This can easily be understood also from FIG. 1.

This procedure is repeated with a third and a fourth image, where the third and a fourth image shows a rotation and a translation compared to the first image. The rotation of the trailer between the first image and third and a fourth image is around a different axis to the rotation of the trailer between the first image and second image. In other words, if the rotation of the trailer between the first and second image consists only of yaw, the rotation of the trailer between the first and third and a fourth image should contain a pitch or roll component. Due to this rotation and translation a second rotation axis may be determined which is different from the first rotation axis. Both rotation axes are running through the tow hitch as, of course, the tow hitch is a fixed point, where the draw bar is mounted for drawing the trailer. Therefore, the two axes may be intersected, where the intersection is the tow hitch.

As the above calculations are carried out with a single camera (monocamera), distance and scale are unknown. In other words, the distance of the rotation axis and tow hitch from the camera is unknown. To calculate the intersection of the rotation axes, the rotation axes are projected onto the image plane (a plane at z=1, where the z axis runs down the optical axis). The rotation axes project to the same line on the image plane regardless of their distance from the camera. The intersection of the rotation axis lines in 2D on the image plane are then calculated, which gives a vector, or ray, to the tow hitch position.

In order to calculate the position of the tow hitch, a further geometrical condition is necessary.

It should be noted that it may not be necessary to calculate the position of the tow hitch. For many Trailer Reverse Assist algorithms, it is only necessary to calculate the angle of the trailer relative to the longitudinal axis of the car. It is sufficient to know the vector to the tow hitch position for this purpose and an arbitrary distance (e.g. unit distance) to the tow hitch may be assumed.

Thus, this disclosure relates to using a camera on a vehicle to determine the rotation and translation of a trailer as it is being towed by the vehicle and determining the vector to the tow hitch using these measurements. Further, the present disclosure allows to determine the tow hitch location using this vector, without the need to manually measure where the tow hitch is. Once the tow hitch vector or position has been calculated, this could be stored, and then used later for Trailer Reverse Assist or Trailer Hitch Assist, which assists a driver in hitching their vehicle to a trailer.

In other words, the disclosure calculates a vector to the tow hitch by analyzing the motion (rotation and translation) of a trailer as it is being towed by a vehicle.

The algorithms (e.g. 8 point essential matrix) used to calculate the motion of the trailer with an unknown tow hitch position may be subject to greater errors than algorithms which know the location of the tow hitch. However, over time, this disclosure identifies the location of the tow hitch, and the system may then switch to a more accurate trailer angle calculation method that needs the tow hitch position or vector as an input.

In some examples, the translation is calculated in addition to the rotation because although the trailer only undergoes rotation around the tow hitch, the trailer appears to undergo a translation relative to the camera because the camera is offset from the tow hitch.

Generally, the "geometrical condition" may be any information, which allows the tow hitch vector to be intersected with a line or plane such that the distance to the tow hitch, and therefore the position of the tow hitch, can be calculated.

In some implementations, the geometrical condition is a known extrinsic parameter, such as the camera position of a camera capturing the first, second and third and a fourth images and that the tow hitch position is central at a vehicle, which draws the trailer. The known extrinsic camera position delivers a reference position and the distance to the central position of the tow hitch on the vehicle may be known. With this information the vector, or ray, may be, e.g., intersected with a central plane leading to the position of the tow hitch.

In some implementations, further rotation axes may be determined using a camera mounted on a different but known position. In this case, a second ray may be determined and due to the known positions of the camera and the intersection, the tow hitch position can be determined.

In some implementations, the step S2 of calculating the trailer rotation and trailer translation further includes the step of comparing the captured first image with the captured second image of the trailer (step S6), and identifying positions of features on the trailer in the captured first image relative to their positions in the captured second image (step S7).

The first image may be a zero pose image that may be an image captured in advance or during driving and may be electronically stored. In the case that the image is captured during driving, the image may be generated from a number of captured images where, e.g., a mean value is calculated as zero pose and the generated zero pose image is stored in a memory. The zero pose may be stored as e.g. mathematical information or may be provided as a stored image, in which the trailer is shown in the zero pose.

For comparing the images with respect to determine the rotation and translation, feature correspondences on the trailer in the captured images may be used. These feature correspondences are created using a feature detection and matching algorithm, such as SIFT (Scale-invariant feature transform), SURF (Speeded Up Robust Features) or BRIEF (Binary Robust Independent Elementary Features). Features in the image that represent the trailer may be separated from features that represent the background by a learning algorithm that runs during a straight calibration drive. During this drive static features are identified as trailer features. Alternative methods of determining features on the trailer may be used, such as finding a predetermined pattern on the trailer and tracking features on the pattern as the trailer moves. Alternatively, information on the trailer's appearance may be stored and used to find features on the trailer.

In the case that the first image is a zero pose image captured during this calibration drive, it is sufficient to store the features, so that "zero pose image" may be interpreted to consist just of the trailer features.

In some implementations, the step S2 of calculating the trailer rotation and trailer translation further includes projecting the calculated first and second rotation axis into an image plane (step S9). By projecting the rotation axes into an image plane, lines are obtained that will intersect at a single point in the image plane. The image plane is a virtual plane onto which 3D objects are projected using the ideal pinhole camera model. The intersection of the rotation axes lines on the image plane define a vector from the camera's optical center, through the intersection point on the image plane, to the estimated location of the tow hitch.

This may also be thought of as two intersecting planes, each plane containing the rotation axis and the camera's position. The intersection of these planes is a line or vector to the tow hitch position from the camera center.

Using a further geometrical condition such as described above, the tow hitch position may be calculated.

In some implementations, the step S2 of calculating the trailer rotation and trailer translation further includes using the calculated tow hitch vector or position as an input for a method of calculating a trailer angle (step S8). Such methods of calculating a trailer angle may be methods known to a person skilled in the art. A Trailer Hitch Assist system or a trailer Reverse Assist system is finally provided electronically with necessary information of the obtained orientation of the trailer.

A second aspect of the disclosure provides a calculation unit of a vehicle for calculating a vector to a tow hitch position of a vehicle attached to a trailer, where the calculation unit is configured for calculating a trailer rotation and a trailer translation based on a captured first image of the trailer in a first pose and a captured second image of the trailer in a second pose (step S2). The calculation unit is also configured for calculating a first rotation axis of the trailer between the first pose and the second pose based on the calculated trailer rotation and trailer translation (step S3) and repeating steps S2 and S3 with another pair of images of the trailer thereby calculating a second rotation axis of the trailer (step S2* and S3*). The calculation unit is also configured for determining an intersection of the first and second rotation axis to determine a ray to the tow hitch position (step S4), and using the ray to the tow hitch position and a geometrical condition to calculate the tow hitch position (step S5).

The calculation unit may include one or more processors, a memory and interfaces to the camera. Furthermore, it may have an interface to a Trailer Hitch Assist system or a trailer Reverse Assist system especially to provide the information about the tow hitch vector or position and the orientation the trailer to these systems, or to receive a request for determining this information. The calculation unit calculates the tow hitch vector or position and the orientation according to the method described above.

According to a third aspect of the disclosure, a vehicle with a camera for capturing images of a trailer and with a calculation unit is provided.

According to a fourth aspect of the disclosure, a program element is provided, which when being executed on a processor, instructs the processor to perform the method described above.

According to a fifth aspect of the disclosure, a computer readable medium is provided on which said program element is stored.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
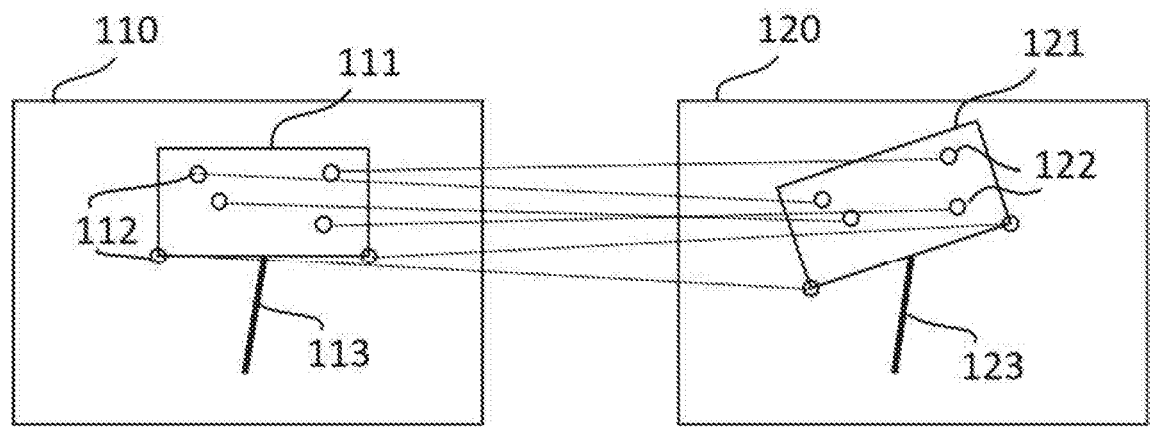
FIG. 1 shows an illustration of a first image or zero pose image and a second image which is used in a method for calculating a tow hitch position of a trailer.

FIG. 1 shows an illustration of a first image 110 and a second image 120 which is used in a method for calculating a tow hitch position of a trailer. The first image 110 contains a trailer 111 with features 112, e.g. on its front side as shown in FIG. 1, and a draw bar 113. Similarly, a second image 120 contains the same trailer 121 but rotated around the tow hitch with rotated and translated features 122, e.g. on its front side as shown in FIG. 1, and a rotated draw bar 123. The image features 112 on the trailer 111 may, for example, be identified by a learning process. In some implementations, the learning process may include detecting and tracking image features in the image 110 during driving forwards in a straight line. After a predetermined time, it is assumed that the trailer 111 is at a zero angle behind the vehicle. The identified image features 112 on the trailer may then be regarded to have a fixed orientation on the image 110, i.e., they appear to be static in the image 110, whilst further features on the image 110, as e.g., features on the ground and other objects will move in the image. The image features 112 at the zero pose are finally stored.

In some implementations, the trailer angle may then be calculated relative to the first pose or zero pose as follows. On a second image 120, the trailer image features 122 identified at the first pose are tracked as they move to their position at the current trailer pose. Extrinsic and intrinsic camera calibration is used to determine the camera ray for each image feature 122 at the current and first pose, where the extrinsic and intrinsic camera calibration values take into account the geometry of the mounting of the camera on the vehicle and the internal geometrical parameters of the camera optics. Next, a transformation matrix is calculated using the camera rays for the image features at the first and current pose. An example of a suitable transformation matrix is the so called "Essential Matrix". This may be calculated using a variety of algorithms familiar to a person skilled in the art, such as the Eight-Point Algorithm. A RanSaC method could be used to reject outliers when more than eight features are used. Finally, the rotation and translation values are extracted from the Essential Matrix or transformation matrix.

Figure 2:
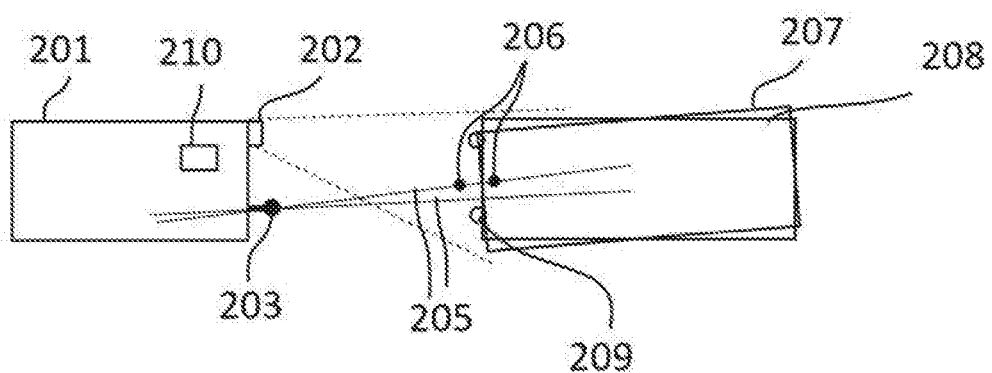
FIG. 2 shows an illustration of rotation axes.

FIG. 2 illustrates in a side view the vehicle 201 with a camera 202 and a tow hitch 203. A trailer is indicated to be in a first pose 208 and a second 207 pose. The poses may include a rotation around the tow hitch having a pitch, yaw and roll angle. The trailer's yaw, pitch and roll rotation between the first pose and the second pose may also be expressed using an axis-angle representation, described by Euler's Rotation Theorem. This describes the trailers rotation as a single rotation around a fixed rotation axis or Euler Axis, rather than a rotation including yaw, pitch and roll for instance. The rotation axes 205, which are the axes about which the trailer rotates between the first pose and the current poses may be determined, e.g., by calculating invariant points 206 in the 3D space which may be an output of the transformation described above. The invariant points 206 lie on the rotation axes 205. The rotation axes intersect at the tow hitch 203, where, without a further condition the distances between the tow hitch 203 and the camera 202, the camera and the rotation axes 205 and the features 209 are not known, and therefore, the position of the tow hitch is also not known at this stage. When projected onto the image, these axes appear as line.

Instead of two images, a number of images may be evaluated, so that over time, many rotation axes are accumulated, each having a slightly different orientation. For instance, if the trailer undergoes a change in pitch, the axis will be horizontal. If the trailer undergoes yaw, the axis will be vertical.

Defining planes containing the axis of rotation and the camera position, these axes will intersect at a single point in the image plane. The intersection of these lines will then determine the ray to the tow hitch position.

Given the ray from the camera to the tow hitch position, it may be possible to calculate the precise position of the tow hitch given other geometrical assumptions. For instance, if the extrinsic camera position is known and the tow hitch is at y=0, it may be possible to intersect the tow hitch ray with the y=0 plane, which is the vertical plane perpendicular to the rear side of the vehicle, e.g. at the center of the rear side.

Alternatively, an arbitrary scale can be picked. E.g., it may be assumed that the distance of the tow hitch to the camera is 1 meter along this ray.

Figure 3:
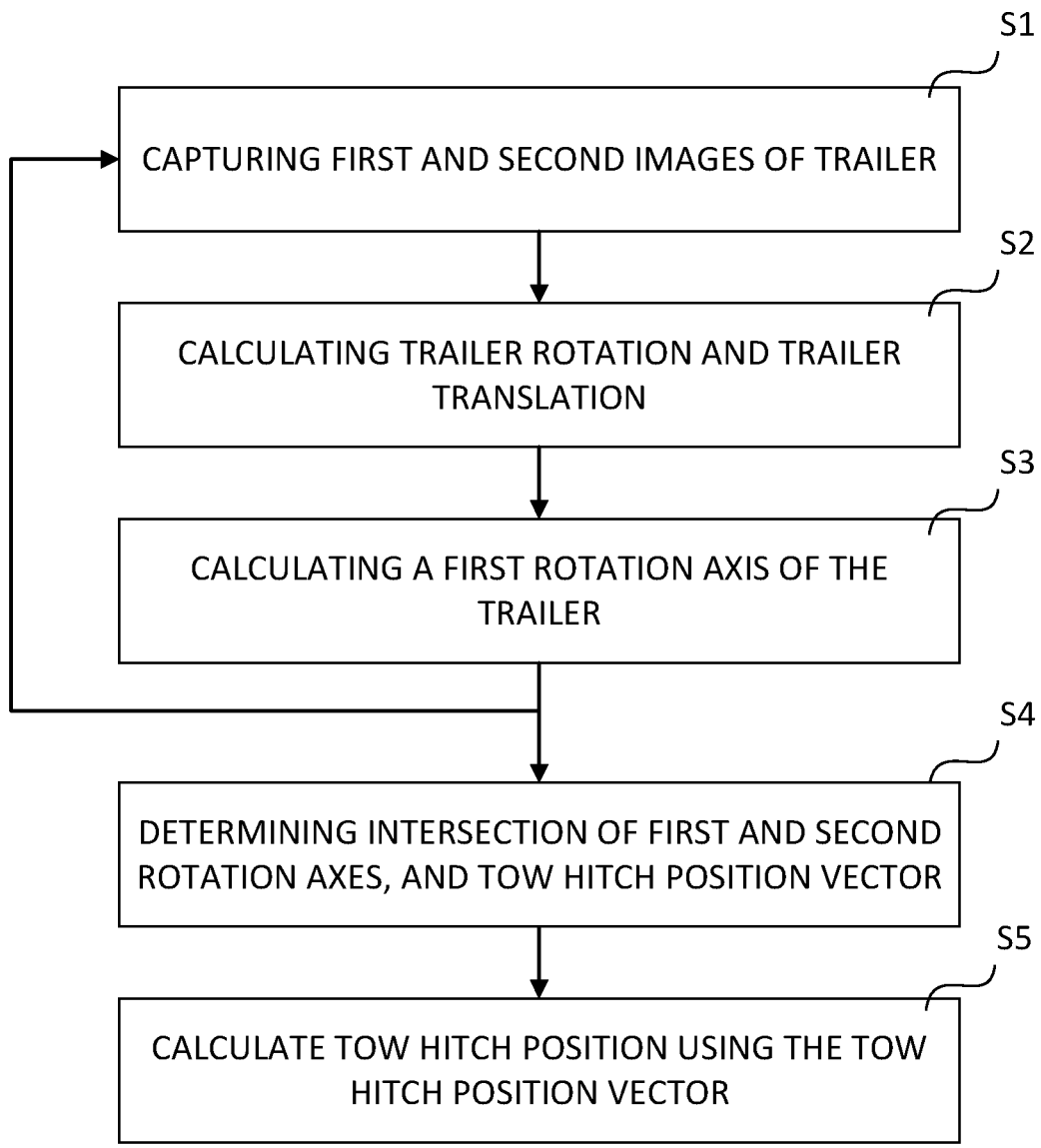
FIG. 3 shows a flow diagram of a method for calculating a tow hitch position of a trailer.

FIG. 3 is a flow diagram of the method for calculating a tow hitch position of a trailer. In a first step S1, a first image of the trailer and a second image of the trailer are captured. In a second step S2, a trailer rotation and a trailer translation between the first image and second image are calculated based on the captured first image and second image. In a third step S3, a first rotation axis of the trailer between the first image and second image is calculated based on the calculated trailer rotation and trailer translation. Steps S1 to S3 are repeated at least once but preferably a number of times with a third and a fourth image or a number of images, respectively, of the trailer, thereby calculating a second rotation axis or a number of rotation axes, respectively, of the trailer in the third or further images. In the next step S4, an intersection of the calculated rotation axes is determined to determine a ray to the tow hitch position. In the last step S5, the ray to the tow hitch position and a geometrical condition are used to calculate the tow hitch position.

Steps S1 to S3 could be repeated with any pair of images which capture the trailer in two different poses, and thus may be used to calculate a rotation axis which will intersect the tow hitch position.

Thus, by tracking the motion of the trailer the location of a tow hitch mounted on a vehicle is determined. The tracking is performed by capturing images with a camera, which is also mounted on the vehicle. This allows to determine the tow hitch position electronically without manual measurements. The tow hitch position can be stored and provided to a Trailer Hitch Assist, which may include a more accurate trailer angle calculation algorithm, which needs the tow hitch position as input.

The vector to the tow hitch may also be used in other algorithms to determine the trailer angle. Such algorithms do not need to know the location of the tow hitch since they may be scale invariant.

The vector to the tow hitch may also be plotted on a display device so that a user can determine if the trailer hitch has been detected correctly. The system does not need to know the tow hitch position to plot the projection on the image, the tow hitch vector is sufficient.

Since this system calculates the tow hitch vector or position using the motion of the trailer, the system may also operate in situations where the tow hitch does not appear in the captured image.

The system may also be adapted to calculate two pivot locations of a trailer, such as a trailer with two axles in which the front axle pivots.

A number of implementations have been described. Nevertheless, it will be understood that various modifications may be made without departing from the spirit and scope of the disclosure. Accordingly, other implementations are within the scope of the following claims.

What is claimed is:

1. A method for calculating a vector to a tow hitch position of a vehicle attached to a trailer via the tow hitch, the method comprising:
   capturing a first image of the trailer in a first position and a second image of the trailer in a second position using an image capture device;
   calculating a trailer rotation and a trailer translation relative to the image capture device between the first position and the second position;
   calculating a first rotation axis of the trailer between the first image and the second image based on the calculated trailer rotation and trailer translation;
   repeating the capturing of the first and second images, the calculating of the trailer rotation and the trailer translation, and the calculating of the first rotation axis with a third image and a fourth image of the trailer thereby calculating a second rotation axis of the trailer between the third image and the fourth image; and
   determining an intersection of the first and second rotation axis, and determining a vector to the tow hitch position based upon the determined intersection,
   wherein determining the intersection of the first and second rotation axes comprises calculating a line of intersection between a first plane and a second plane, wherein the first plane is defined by a location of the image capture device and the first rotation axis, and the second plane is defined by the image capture device location and the second rotation axis.

2. The method of claim 1, wherein the calculating of the trailer rotation and trailer translation further comprises:
   calculating a trailer angle based on the determined vector to the tow hitch position as an input.

3. The method of claim 1, wherein the method further comprises:
   calculating the tow hitch position based on the determined vector to the tow hitch position and a geometrical condition.

4. The method of claim 3, wherein the geometrical condition includes a known extrinsic camera position of a camera capturing the first and second images and that the tow hitch position is central at a vehicle, which draws the trailer.

5. The method of claim 1, wherein the calculating of the trailer rotation and trailer translation further comprises:
   comparing the captured first image with the captured second image of the trailer, and
   identifying positions of features of the trailer in the captured first image relative to their positions in the captured second image.

6. The method of claim 1, wherein the calculating of the trailer rotation and trailer translation further comprises:
   projecting the calculated first and second rotation axis into an image.

7. The method of claim 1, wherein a yaw, pitch and roll rotation of the trailer between the first position in the first image and the second position in the second image is expressed by the first rotation axis.

8. The method of claim 1, wherein the first rotation axis includes pitch, yaw and roll rotation of the trailer between the first image and the second image, and the second rotation axis includes pitch, yaw and roll rotation of the trailer between the third image and the fourth image.

9. A calculation unit of a vehicle for calculating a tow hitch position of a trailer, wherein the calculation unit includes a processor and non-transitory computer readable medium having program instructions which when executed by the processor instructs the calculation unit to perform:
   calculating a trailer rotation and a trailer translation based on a captured first image of the trailer in a first pose and a captured second image of the trailer in a second pose;
   calculating a first rotation axis of the trailer between the first pose and the second pose based on the calculated trailer rotation and trailer translation;
   repeating the calculating of the trailer rotation and the trailer translation and the calculating of the first rotation axis with a captured third image of the trailer in a third pose and a fourth image in a fourth pose thereby calculating a second rotation axis of the trailer; and
   determining an intersection of the first and second rotation axis, and determining a ray to the tow hitch position based upon the determined intersection,
   wherein determining the intersection of the first and second rotation axes comprises calculating a line of intersection between a first plane and a second plane, wherein the first plane is defined by a location of the image capture device and the first rotation axis, and the second plane is defined by the image capture device location and the second rotation axis.

10. The calculation unit of claim 9, wherein the program instructions when executed by the processor further instructs the calculation unit to use the ray to the tow hitch position and a geometrical condition to calculate the tow hitch position.

11. The calculation unit of claim 9, wherein the calculating of the trailer rotation and trailer translation further comprises calculating a trailer angle based on the determined vector to the tow hitch position as an input.

12. The calculation unit of claim 9, wherein the program instructions, when executed by the processor, instruct the calculation unit to calculate the tow hitch position based on the determined vector to the tow hitch position and a geometrical condition.

13. The calculation unit of claim 12, wherein the geometrical condition includes a known extrinsic camera position of a camera capturing the first and second images and that the tow hitch position is central at a vehicle, which draws the trailer.

14. The calculation unit of claim 9, wherein the calculating of the trailer rotation and trailer translation further comprises:
    comparing the captured first image with the captured second image of the trailer, and
    identifying positions of features of the trailer in the captured first image relative to their positions in the captured second image.

15. The calculation unit of claim 9, wherein the calculating of the trailer rotation and trailer translation further comprises projecting the calculated first and second rotation axis into an image.

16. The calculation unit of claim 9, wherein a yaw, pitch and roll rotation of the trailer between the first position in the first image and the second position in the second image is expressed by the first rotation axis.

17. A vehicle comprising:
    a camera for capturing images of a trailer; and
    a calculation unit including a processor and memory having program instructions which when executed by the processor instructs the calculation unit to perform:
        calculating a trailer rotation and a trailer translation based on a captured first image of the trailer in a first pose and a captured second image of the trailer in a second pose;
        calculating a first rotation axis of the trailer between the first pose and the second pose based on the calculated trailer rotation and trailer translation;
        repeating steps the calculating of the trailer rotation and the trailer translation, and the calculating of the first rotation axis with a captured third image of the trailer in a third pose and a fourth image in a fourth pose thereby calculating a second rotation axis of the trailer; and
        determining an intersection of the first and second rotation axis, and determining a ray to the tow hitch position based upon the determined intersection,
    wherein determining the intersection of the first and second rotation axes comprises calculating a line of intersection between a first plane and a second plane, wherein the first plane is defined by a location of the image capture device and the first rotation axis, and the second plane is defined by the image capture device location and the second rotation axis.

18. The vehicle of claim 17, wherein the calculation unit is further configured for calculating the tow hitch position using the ray to the tow hitch position and a geometrical condition.

19. A program element, which when being executed on a processor, instructs the processor to perform the method of claim 1.

20. A non-transitory computer readable medium on which a program element according to claim 10 is stored.

* * * * *